Sept. 28, 1954  W. G. SCHULZE  2,690,011
CURD MILL

Filed Oct. 26, 1949  3 Sheets-Sheet 1

INVENTOR.
William G. Schulze
BY
Quarles & French
Attorneys

Sept. 28, 1954     W. G. SCHULZE     2,690,011
CURD MILL
Filed Oct. 26, 1949     3 Sheets-Sheet 2

INVENTOR.
William G. Schulze
BY
Quarles & French
Attorneys

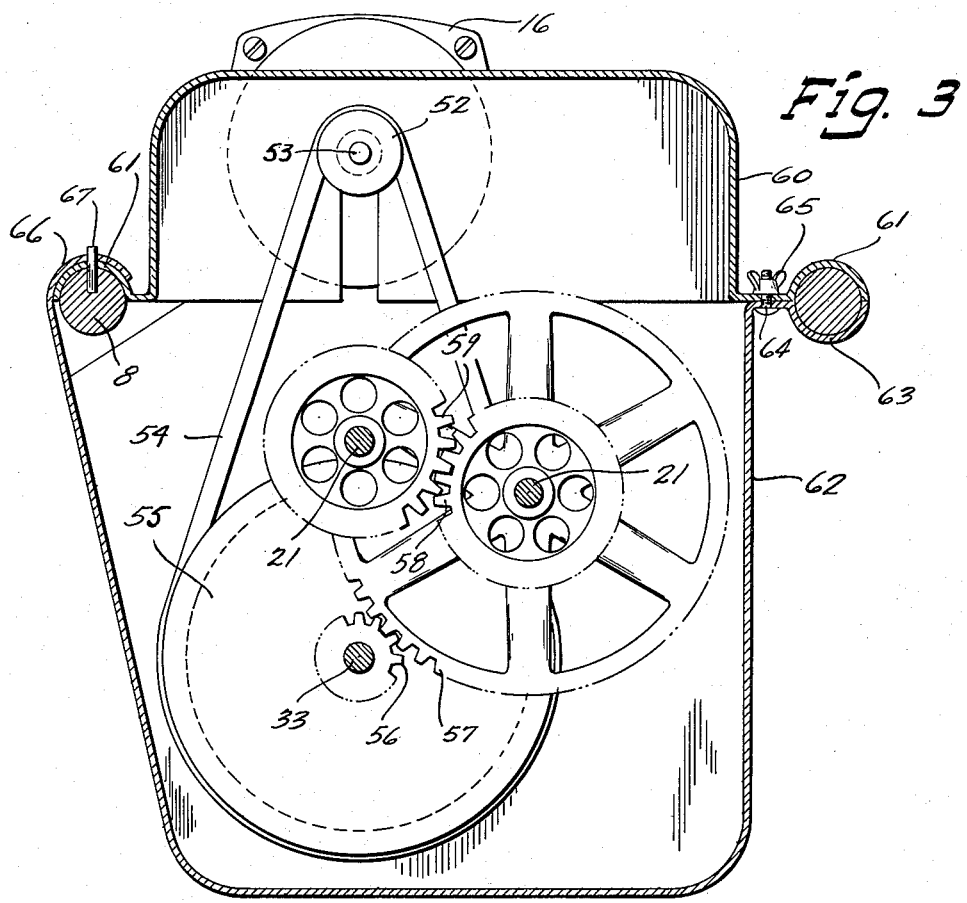
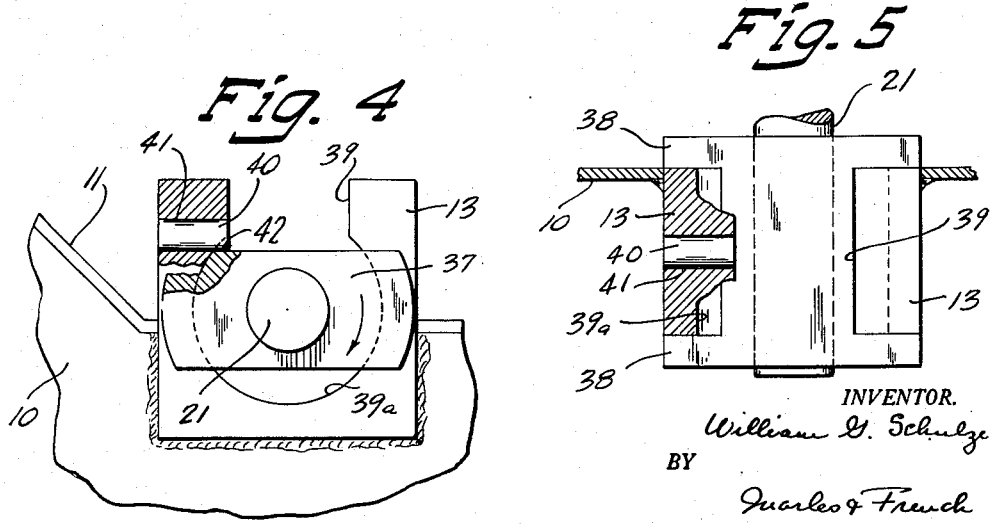

Patented Sept. 28, 1954

2,690,011

UNITED STATES PATENT OFFICE 2,690,011

CURD MILL

William G. Schulze, Fond du Lac, Wis., assignor to Damrow Brothers Company, Fond du Lac, Wis., a corporation of Wisconsin Application October 26, 1949, Serial No. 123,765

3 Claims. (Cl. 31—48)

The invention relates to curd mills for cutting cheese curd into small blocks as one of the steps in the cheese making process.

One of the objects of the present invention is to provide a curd mill in which the parts may be easily disassembled so that every part can be thoroughly cleaned.

A further object of the invention is to provide a curd mill in which the mill and its hopper are set low on the supporting frame so that the operator does not have to reach up high when lifting slabs of curd from the bottom of the vat into the hopper.

A further object of the invention is to provide a curd mill having upper and lower sets of intermeshing spaced disks, a rotary cutter beneath said disks, a fixed cutter bar between the lower set of disks and said rotary cutter.

A further object of the invention is to provide a curd mill in which the strippers for the disk assemblies form the bottom of the hopper.

A further object of the invention is to provide a curd mill in which the driven rotary cutter and the driven disk assemblies each have their bearings mounted in side frame members and a half turn of said bearings frees each rotary part from the side frame members and permits ready disconnection of its drive connections and the easy removal of the individual rotary parts.

The invention further consists in the several features hereinafter set forth and more particularly defined by claims at the conclusion hereof.

In the drawings:

Fig. 3 is a detailed vertical sectional view taken on the line 3—3 of Fig. 1;

Fig. 4 is an enlarged detailed side elevation view of one of the removable bearings, parts being broken away and parts being shown in section;

Fig. 5 is an enlarged plan view of the bearing and its mounting, parts being broken away and parts being shown in section;

Figure 1:
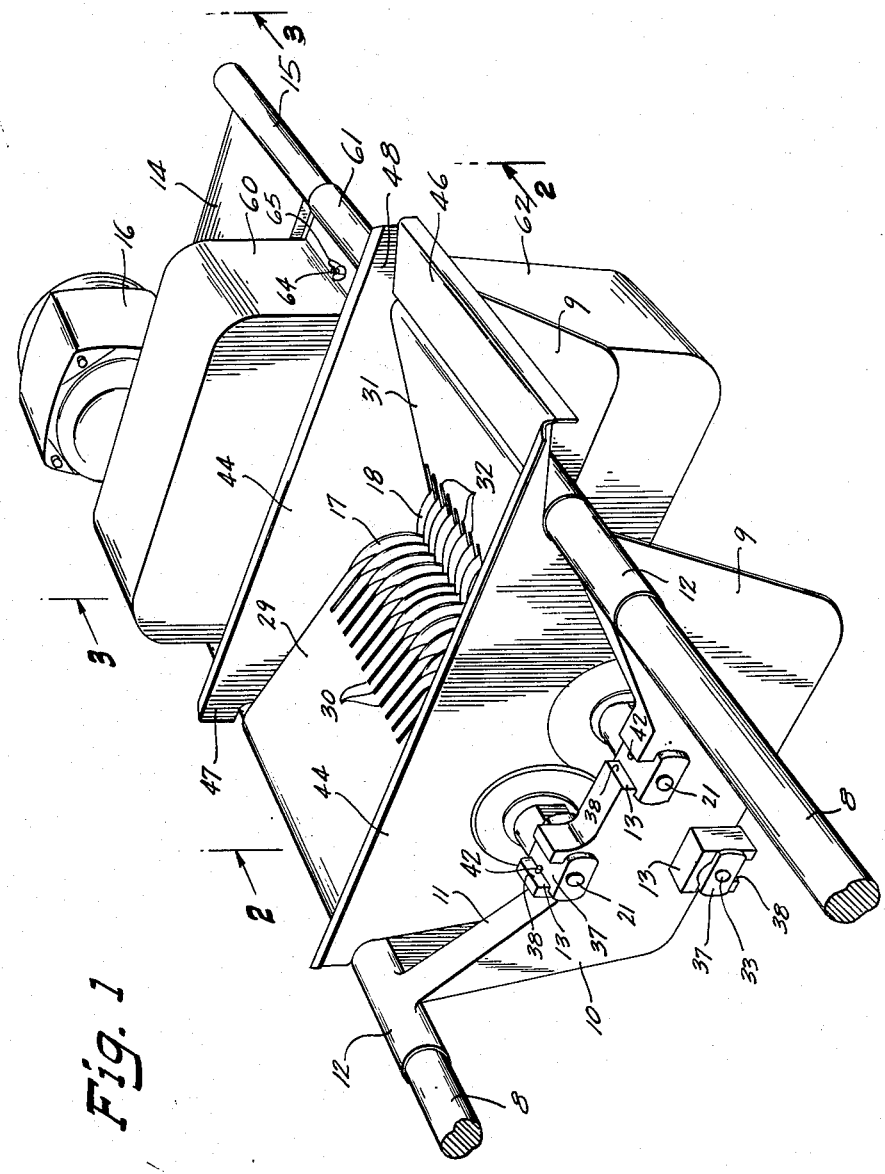
Fig. 1 is a perspective view of a curd mill embodying the invention.
Figure 2:
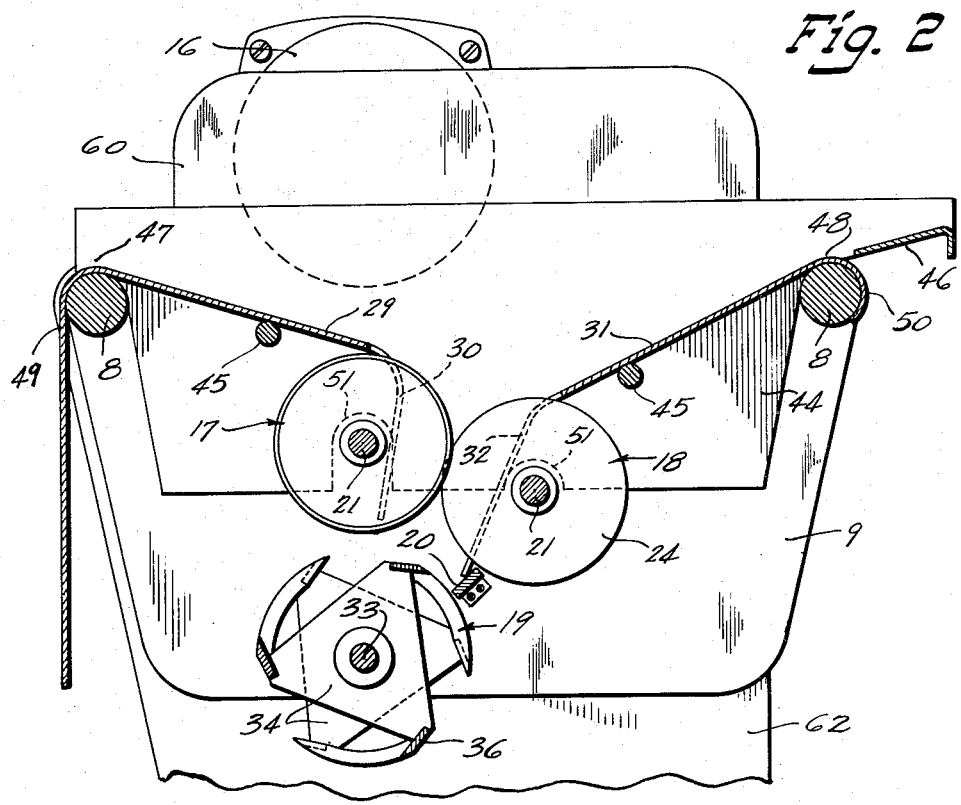
Fig. 2 is a detailed vertical sectional view taken on the line 2—2 of Fig. 1.
Figure 6:
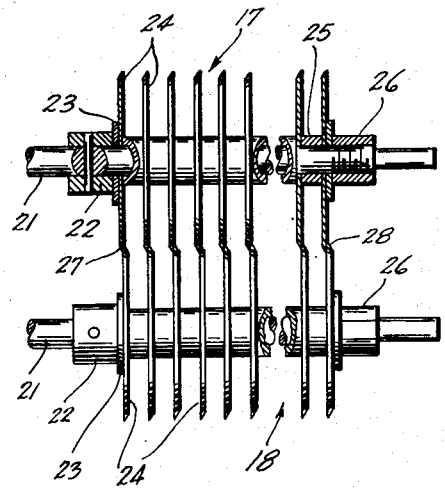
Fig. 6 is an elevation view of the disk assemblies, parts being broken away and parts being shown in section.
Figure 7:
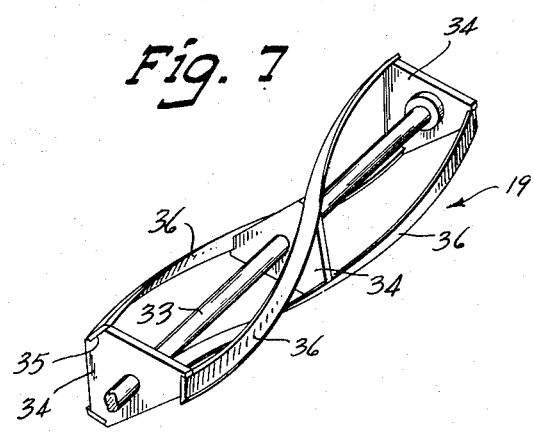
Fig. 7 is a perspective view of the rotary cutter.

Referring to the drawings, the curd mill includes a pair of spaced frame members or bars 8 that are adapted to span the sides of the vat and support the mill from the tops of said sides. Spaced bearing supports or transverse frame members 9 are mounted on the bars 8 and one of which appears in Fig. 1 and the other in Fig. 2. Each member 9 is formed from a sheet metal plate 10 whose top edge 11 is flanged, said plate having tubular members 12 welded thereto and fitting said bars and also having bearing boxes or bosses 13 welded thereto. A motor supporting base plate 14 has tubular ends 15 fitting said bars. The members 9 and plate 14 form transverse supports for the bars 8. An electric motor 16 is mounted on the plate 14.

The mill has an upper disk assembly 17, a lower disk assembly 18, a rotary cutter 19, and a fixed cutter bar 20, these parts being carried by the supports 9.

Each of the disk assemblies 17, 18 comprises a shaft 21, a stop collar 22 pinned to said shaft, a washer 23, a plurality of cutter disks 24, spacer collars 25 between the disks and a clamping nut 26 in threaded engagement with one end of the shaft and bearing against a spacer collar 25 whereby on the removal of said nut all the disks and their spacers may be removed from said shaft 21.

The disks 24 for the assembly 17 have their outer edges 27 bevelled in one direction, while those for the assembly 18 have their outer edges 28 bevelled in the opposite direction, and in the assembled position of these disk assemblies these edges overlap with their flat sides in abutting relation, these disk sets cooperating to cut the curd longitudinally into long strings or shreds which pass down between said disks and are engaged by the rotary cutter 19 and cut into small cubes as they are carried by said cutter against the fixed bar 20 which also keeps them from passing through the space between said cutter 19 and the lower set of disks 18. By using two sets of disks instead of a disk and solid roller the curd is cut without much squeezing. Much squeezing tends to squeeze too much whey with resultant solids from the slabs of the curd which is not desirable. Also a better cutting action is effected by two disks which results in faster milling of the curd.

A stripper plate 29 has stripper fingers 30 extending into the spaces between the disks of the disk assembly 17, and a stripper plate 31 has stripper fingers 32 extending into the spaces between the disks of the disk assembly 18.

The rotary cutter 19 is specially formed for easy cleaning and comprises a shaft 33, spaced cutter bar heads 34 mounted on said shaft and of triangular shape with their apices 35 flattened and angularly disposed relative to each other to receive the spirally curved cutter blades 36 which are welded to said apices.

Each of the shafts 21 and the shaft 33 are mounted at their ends in bearing blocks 37. Each block 37 has spaced annular flanges 38 that fit over the sides of its bearing boss or box 13 in the assembled position of said bearing in said box. Each box has a cylindrical opening 39a, a slot 39 in one side thereof, and the flanges 38 and part of the main body of the bearing are flattened as shown in Fig. 4 to a width to pass through the slot 39, so that when the flattened sides of the bearing are disposed in line with the slot 39, the bearing may be slipped through said slot to a position in which the flanges 38 clear the sides of the box and then may be turned at right angles to its initial position of insertion to the position shown in Fig. 4 and may be locked in this position by a pin 40 mounted in a bore 41 in the box and movable therein to project out slightly at 42 against the flat side 43 of the bearing, said pin being mounted on that side of the box against which the shaft tends to revolve the bearing, so that the bearing is prevented from revolving in the box. Shifting of the pin 40 from its stop limiting position permits the bearing being turned to a position for removal through the slot 39. For each shaft 21 the slot 39 extends in from the top of the bearing box while for the shaft 33 the slot 39 extends in from the bottom of the bearing box.

The curd is fed into a hopper having side plates 44 and a bottom formed by the stripper plates 29 and 31. The side plates 44 are joined together by transversely disposed rods 45 and an apron 46 and rest at their ends 47 and 48 on the frame bars 8. The stripper plate 29 rests on one of the rods 45 and has an end portion 49 resting on one of the bars 8. The stripper plate 31 rests on the other rod 45 and has a curved end 50 engaging the other frame bar 8. The side plates 44 are notched out at 51 as shown in dotted lines in Fig. 2, to clear parts of the disk assemblies.

Referring to Fig. 3, the drive motor 16 carries a pulley 52 on its drive shaft 53 connected by a belt 54 with a large pulley 55 on the extended end of the shaft 33 which also carries a small gear 56 meshing with a larger gear 57 on the shaft 21 of the lower disk assembly which shaft carries a gear 58 meshing with a similar gear 59 on the shaft 21 for the upper disk assembly. The rotary cutter 19 rotates at a higher speed than the disk cutters with the above described gearing, and the disk assemblies 17 and 18 rotate at the same speed in opposite directions.

Releasing the belt from the pulley 55 permits the shaft 33 being dropped down from the side supports on the turning of its bearing block 37 to a position where they can slide down through the slot 39, and at the same time the gears 56 and 57 are disconnected so that the rotary cutter 19 may be readily removed. The upper and lower disk assemblies 17 and 18 are removable from the top of the side supports for their shafts 21 when their bearing blocks 37 are turned to a release position.

The drive connections above described are enclosed within a housing formed by an upper housing member 60 that has curved base flanges 61 engaging the bars 8 and a lower housing member 62 that has a curved flange 63 held in engagement with one bar 8 by a bolt 64 and wing nut 65 and a curved hook flange 66 that engages over one of the flanges 61 of the other housing member and which may be locked in this position by a pin 67 extending through both of said flanges and anchored in the bar 8 associated with the side of the housing.

With the above construction as both the main body of the hopper and the operative parts of the mill are disposed below the level of the frame bars 8, the operator does not have to reach up high when lifting slabs of curd from the bottom of the vat into the hopper which is important since the operator then has to stand in a stooped position. Also from the description it will be noted that parts may be easily disassembled so that every part can be thoroughly cleaned.

I desire it to be understood that this invention is not to be limited to any particular form or arrangement of parts except in so far as such limitations are included in the appended claims.

What I claim as my invention is:

1. In a curd mill, the combination of frame bars adapted to straddle the sides of a cheese vat, of spaced side frame members having socket portions slidably mounted on said frame bars, means connecting said frame members in spaced relation including rods inwardly spaced from said frame bars, separate stripper plates disposed between said side frame members and resting on said frame bars and said rods, said stripper plates and side frame members in their assembled position forming a hopper, and intermeshing sets of spaced cutting disks forming a part of the bottom of said hopper and with which said stripper plates cooperate, each set of cutting disks mounted on a shaft journalled in and supported entirely by said side frame members.

2. In a curd mill, the combination with a supporting frame including frame bars adapted to straddle and rest on the tops of the sides of a cheese vat, of a hopper carried by the frame and whose major portion is its bottom which projects below said bars, stripper plates engaging over said bars and forming the upper parts of the front and back sides of the bottom of said hopper, intermeshing sets of horizontally spaced cutting disks forming the lower part of the bottom of the hopper for longitudinally slicing the curd, one set of said disks being offset below that of said other set of disks, and means operatively associated with said cutting disks for transversely cutting the sliced curd.

3. In a curd mill, the combination with spaced side frame members, upper and lower sets of shaft supported cutting disks having their shafts removably connected to said frame members for removal as separate units from the top portions of said frame members, a rotary spiral cutter having a shaft removably connected to said frame members for removal as a separate unit from the bottom portion of said frame members, a motor mounted on one of said frame members, a releasable drive connection between said motor and spiral cutter, intermeshable gears on the shaft of said spiral cutter and the shaft of the lower set of cutting disks, and intermeshable gears on the shafts of said sets of cutting disks.

References Cited in the file of this patent

UNITED STATES PATENTS

| Number | Name | Date |
|---|---|---|
| 252,743 | Davis | Jan. 24, 1882 |
| 369,555 | Roberge | Sept. 6, 1887 |
| 397,544 | Gordon et al. | Feb. 12, 1889 |

(Other references on following page)

UNITED STATES PATENTS

| Number | Name | Date |
|---|---|---|
| 502,355 | Gailbreath | Aug. 1, 1893 |
| 532,858 | Baum | Jan. 22, 1895 |
| 667,408 | Snyder et al. | Feb. 5, 1901 |
| 712,187 | Frazer | Oct. 28, 1902 |
| 971,506 | Junker | Sept. 27, 1910 |
| 980,072 | Cramer | Dec. 27, 1910 |
| 1,309,525 | Junker | July 8, 1919 |
| 1,452,098 | Short | Apr. 17, 1923 |
| 1,710,421 | Jorgenson | Apr. 23, 1929 |
| 2,043,098 | Funk | June 2, 1936 |
| 2,364,533 | Jackson | Dec. 5, 1944 |
| 2,450,688 | Richard | Oct. 5, 1948 |
| 2,472,800 | Ahrndt | June 14, 1949 |
| 2,537,946 | Lindner et al. | Jan. 16, 1951 |

FOREIGN PATENTS

| Number | Country | Date |
|---|---|---|
| 3,491 | Great Britain | 1889 |
| 182,795 | Germany | Apr. 8, 1906 |
| 692,605 | Germany | June 22, 1940 |